United States Patent
Yano

[11] Patent Number: 6,015,164
[45] Date of Patent: Jan. 18, 2000

[54] SEAT BELT DEVICE

[75] Inventor: Hideaki Yano, Shiga, Japan

[73] Assignee: Takata Corporation, Tokyo, Japan

[21] Appl. No.: 09/024,512

[22] Filed: Feb. 17, 1998

[30] Foreign Application Priority Data

Feb. 18, 1997 [JP] Japan .................................. 9-033732

[51] Int. Cl.⁷ .................................................. B60R 22/36
[52] U.S. Cl. ...................... 280/806; 280/808; 242/384.4; 297/478
[58] Field of Search ...................... 280/807, 808, 280/806; 297/478, 480, 483; 242/384.4

[56] References Cited

U.S. PATENT DOCUMENTS

| | | | |
|---|---|---|---|
| 4,401,282 | 8/1983 | Miki | 242/384.2 |
| 4,467,981 | 8/1984 | Mori et al. | 242/384.4 |
| 4,522,350 | 6/1985 | Ernst | 242/376.1 |
| 4,610,480 | 9/1986 | Yamada et al. | 297/478 |
| 4,978,087 | 12/1990 | Tauber . | |
| 5,495,994 | 3/1996 | Rumpf et al. | 242/384.4 |
| 5,716,102 | 2/1998 | Ray et al. . | |
| 5,839,790 | 11/1998 | Doty | 297/478 |
| 5,904,371 | 5/1999 | Koning | 280/806 |

FOREIGN PATENT DOCUMENTS

| | | |
|---|---|---|
| 0 700 812 | 3/1996 | European Pat. Off. . |
| 0 721 868 | 7/1996 | European Pat. Off. . |
| 26 58 747 | 12/1976 | Germany . |
| 4022571 | 7/1991 | Germany . |
| 2 235 124 | 7/1990 | United Kingdom . |

*Primary Examiner*—Paul N. Dickson
*Assistant Examiner*—Lynda Jasmin
*Attorney, Agent, or Firm*—Kanesaka & Takeuchi

[57] ABSTRACT

To allow a weight type acceleration sensor to be employed as an acceleration sensor of a seat belt retractor which is incorporated in a seat back. A seat belt retractor 80 is attached to a seat back 14 and a cable winder 20 is attached to a portion where a supporting arm 12 and a shaft 18 for inclining the seat back 14 are connected to each other. The supporting arm 12 projects from a seat cushion 10 for supporting the seat back 14. Corresponding to the inclination of the seat back 14, the cable winder 20 rotates so that a cable 70 laid between the cable winder 20 and the seat belt retractor 80 is unwound or wound from/onto the winder 20. The attitude of the acceleration sensor 92 attached to the seat belt retractor 80 is controlled by the unwinding or winding of the cable 70 so that the acceleration sensor 92 always stands perpendicularly.

11 Claims, 15 Drawing Sheets

SEAT BELT DEVICE

FIELD OF THE INVENTION

The present invention relates to a seat belt device for protecting a vehicle occupant, more particularly to a seat belt device in which a seat belt retractor is incorporated in the seat back.

BACKGROUND OF THE INVENTION

As well known, a seat belt device restrains an occupant to a vehicle seat with a webbing unwound from a retractor in order to protect the occupant when the vehicle comes into collision. In this seat belt device, a locking mechanism is actuated to stop the rotation of a reel when deceleration in the horizontal direction exceeding a predetermined value is exerted on the vehicle. Often employed as an acceleration sensor for detecting such deceleration is a weight type acceleration sensor having a sensor weight which tilts to the rolling-over side due to the deceleration in the horizontal direction. There are also various types of electrical or electronic acceleration sensors.

A seat belt retractor may be incorporated in a seat back. As a result of incorporating the seat belt retractor in a seat back, a webbing can fit well the occupant, regardless of the inclined angle of the seat back.

In such a case that the seat belt retractor is incorporated in the seat back, a weight type acceleration sensor cannot be employed. That is, when the seat back is inclined, the sensor weight is also inclined, so that the locking mechanism may be actuated. Therefore, conventionally employed as an acceleration sensor in such a retractor incorporated in a seat back is only an electrical or electronic acceleration sensor. This requires electrical wiring to the seat and thus takes a lot of time for assembling the vehicle and for maintenance.

OBJECT AND SUMMARY OF THE INVENTION

It is an object of the present invention to allow a retractor with a weight type acceleration sensor to be incorporated in a seat back.

A seat belt device of the present invention has a seat belt retractor comprising a reel for winding a seat belt, a locking mechanism for locking the rotation of the reel in the seat belt withdrawing direction, an acceleration sensor for activating the locking mechanism, and a retractor frame in which the reel, the locking mechanism, and the acceleration sensor are assembled, the acceleration sensor having a sensor weight which tilts due to an acceleration in the horizontal direction. The seat belt device is characterized by the seat belt retractor being incorporated in a seat back and the acceleration sensor being supported to the retractor frame in such a manner as to pivot about the horizontal axis, a rotor for controlling the attitude of the acceleration sensor to stand the acceleration sensor vertically, the rotor engaging with the acceleration sensor, a rotational member attached to a portion where the seat back and the seat cushion are connected to each other, the rotational member rotating corresponding to the inclination of the seat back, and a connecting member connecting the rotational member with the rotor so that the acceleration sensor always stands vertically regardless of the inclined angle of the seat back.

In this seat belt device, the weight type acceleration sensor can always stand vertically regardless of the inclined angle of the seat back so as to detect only an acceleration in the horizontal direction exerted on the vehicle to perform the locking operation of the retractor.

DESCRIPTION OF THE PREFERRED EMBODIMENTS

Figure 1:
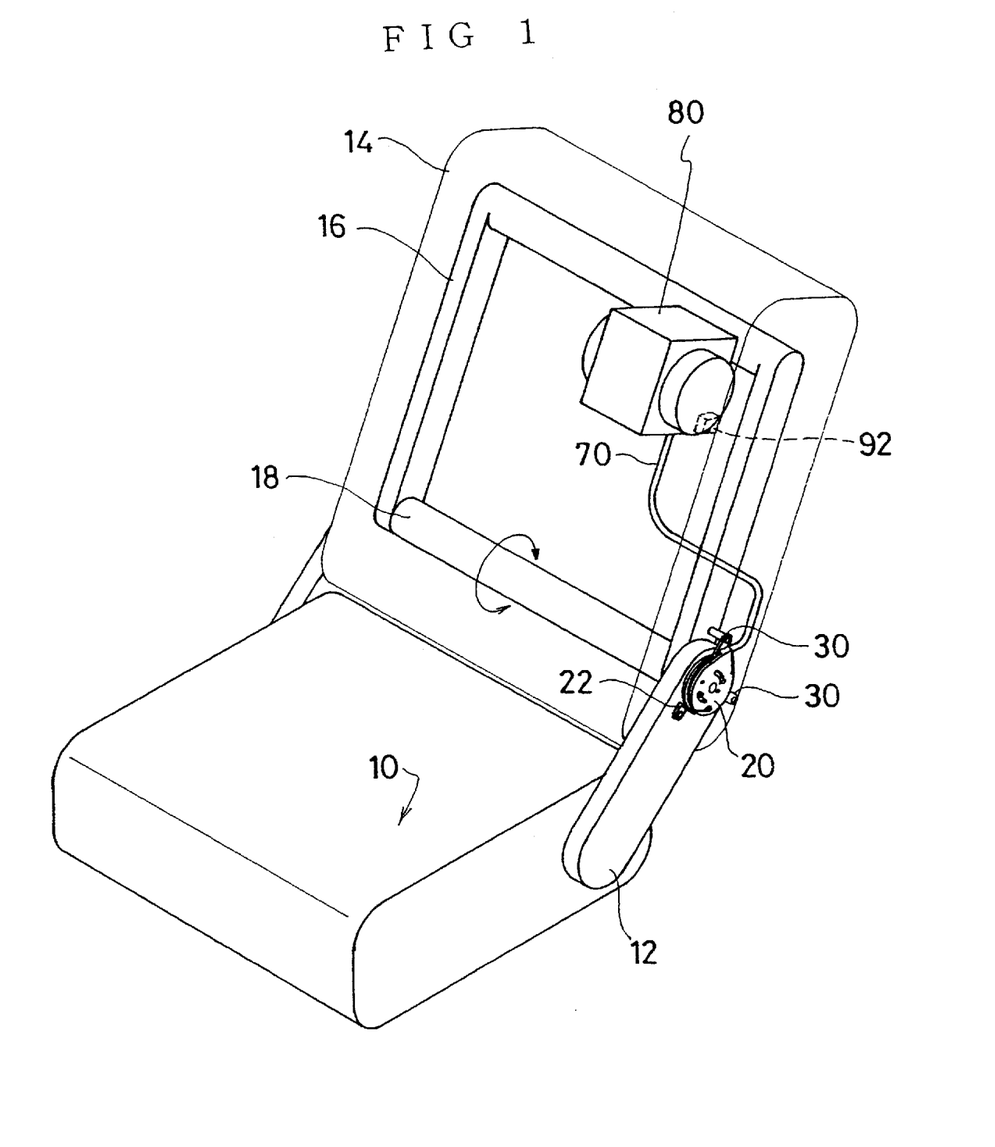
FIG. 1 is a perspective view of a seat provided with a seat belt device according to an embodiment.
Figure 14A:
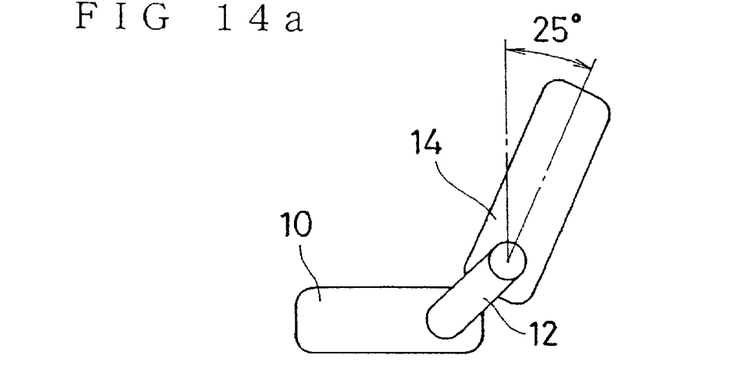
FIG. 14a is a side view of the seat.
Figure 14B:
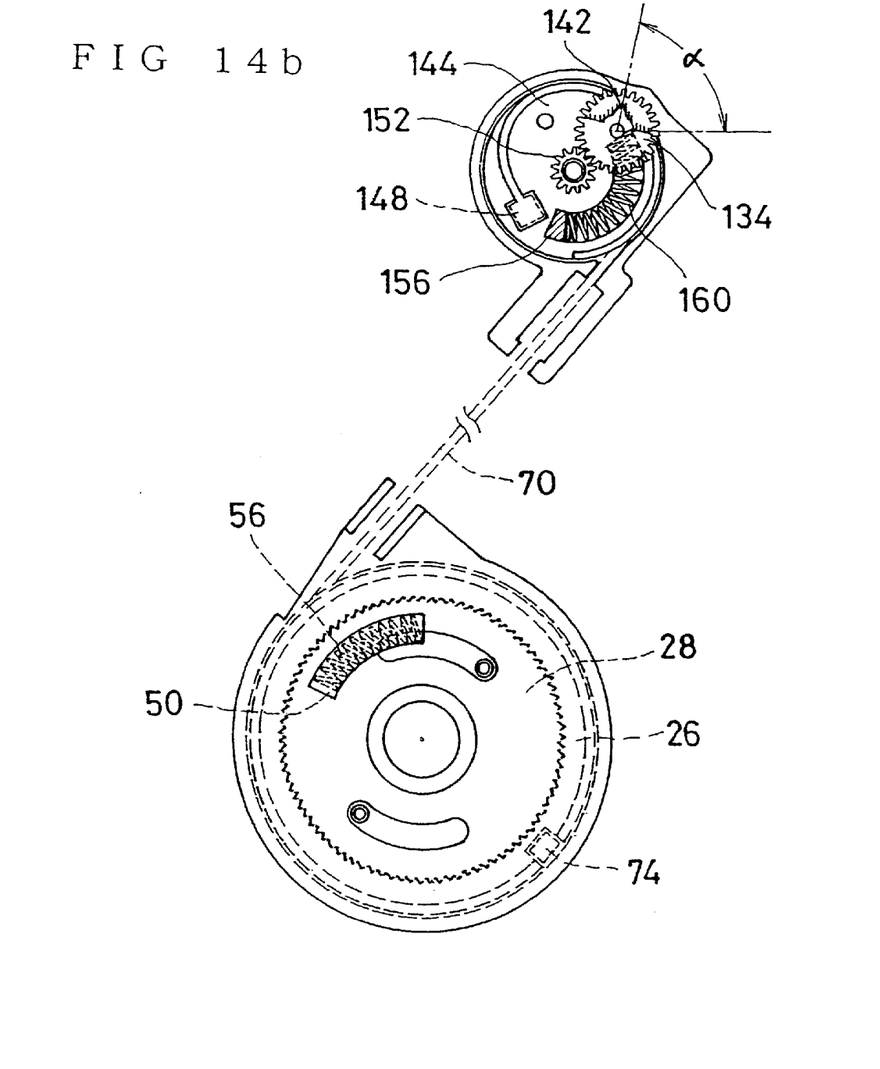
FIG. 14b is an exemplary side view showing the operation of the attitude control mechanism.
Figure 15A:
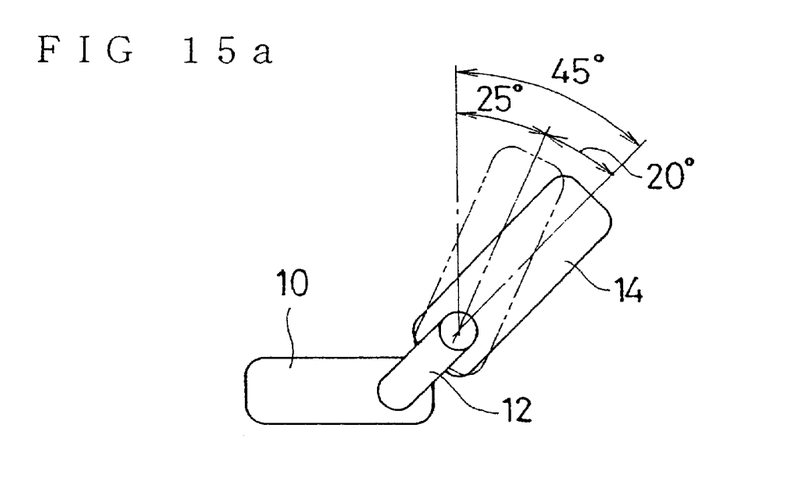
FIG. 15a is a side view of the seat.
Figure 15B:
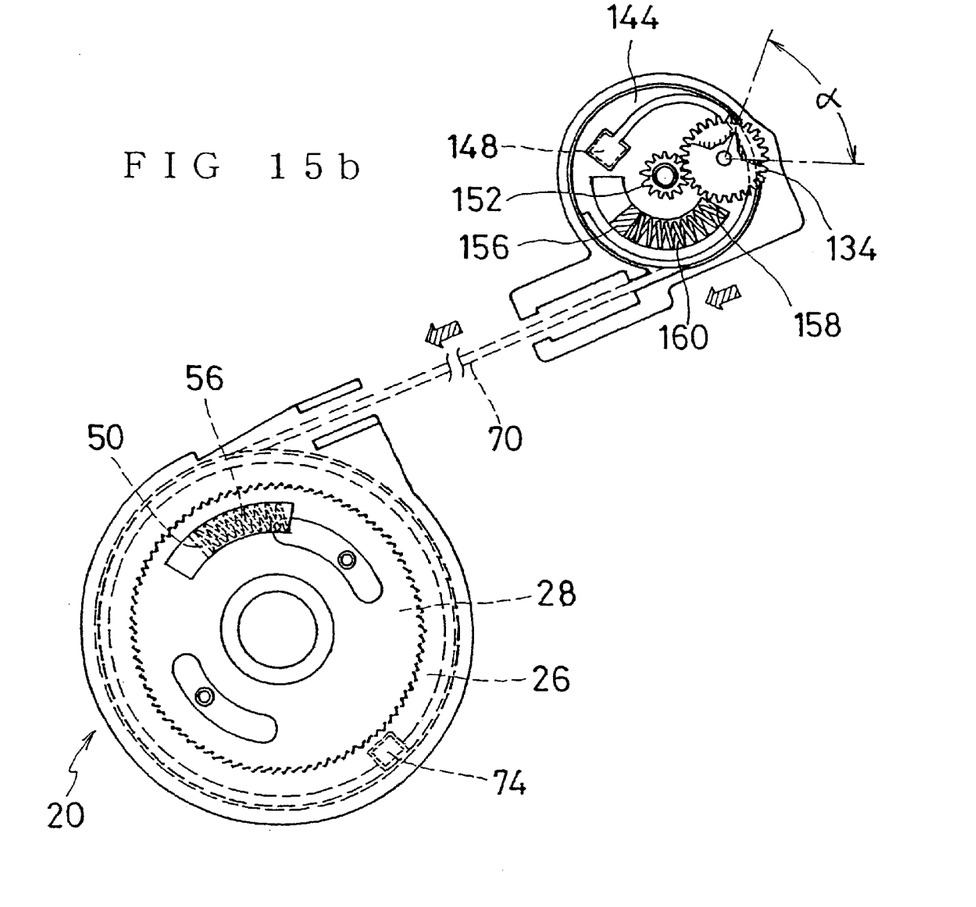
FIG. 15b is an exemplary side view showing the operation of the attitude control mechanism.
Figure 16A:
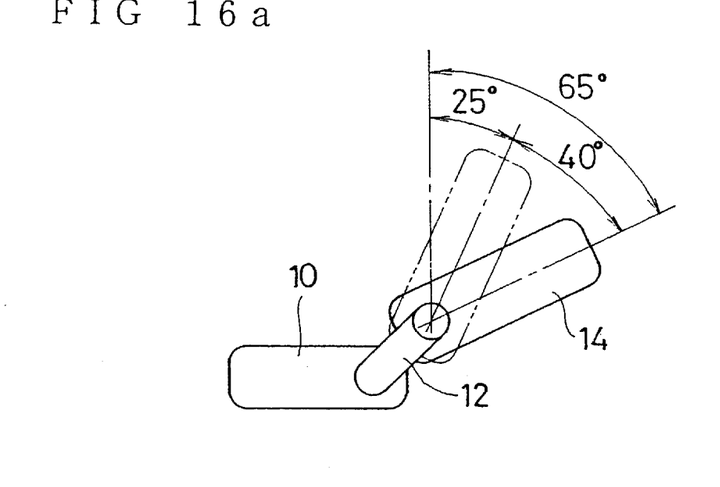
FIG. 16a is a side view of the seat and FIG. 16b is an exemplary side view showing the operation of the attitude control mechanism.
Figure 16B:
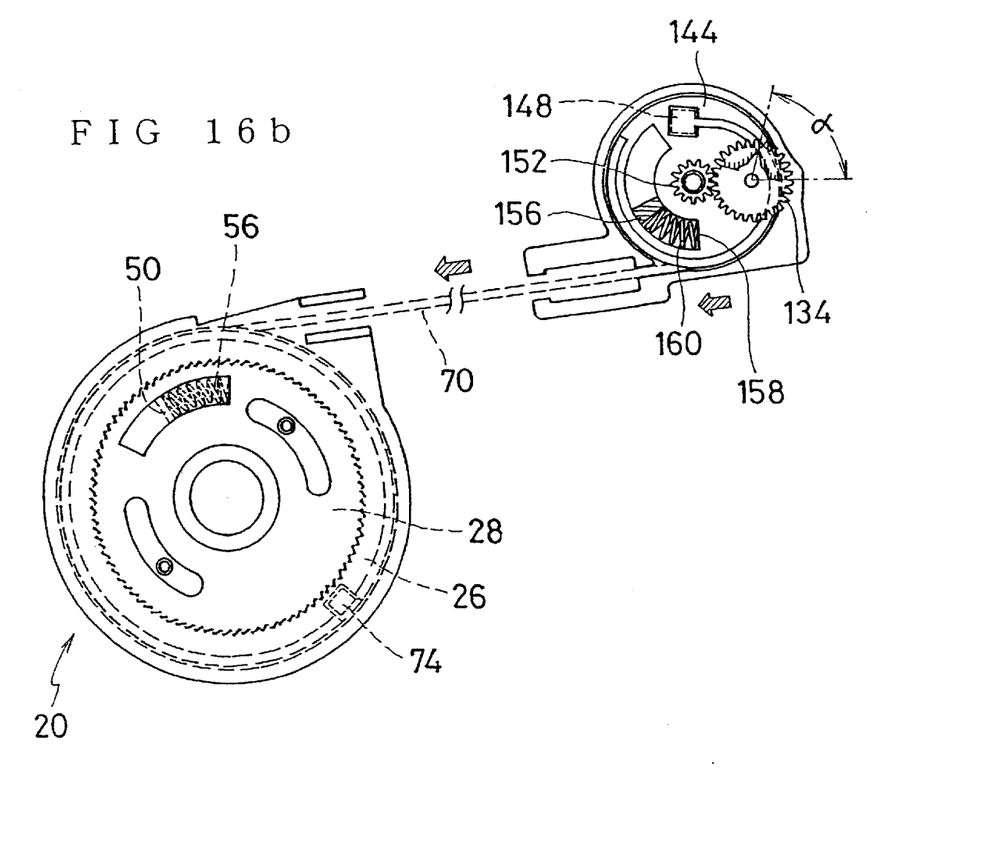

Hereinafter, an embodiment of the present invention will be described with reference to the attached drawings. FIG. 1 is a perspective view showing a vehicle seat provided with a seat belt device according to the embodiment of the present invention, FIG. 2 through FIG. 7 show the structure of a cable winder, FIG. 8 through FIG. 13 are explanatory views of a seat belt retractor and an attitude control mechanism of a sensor weight of the seat belt retractor, and FIG. 14 through FIG. 16 are explanatory views showing the operation of the attitude control mechanism.

As shown in FIG. 1, each support arm 12 is fixed to each side of a seat cushion 10. A seat back is supported in such a manner that the seat back 14 can pivot relative to the support arms 12. The seat back 14 is provided with a seat back frame 16 including a pivot shaft 18. The pivot shaft 18 is supported by the support arms 12. A cable winder 20 is attached to a portion where the pivot shaft 18 and one of the support arms 12 are connected to each other.

A cable 70 is laid between a seat belt retractor 80 fixed to the seat back frame 16 and the cable winder 20.

Figure 2:
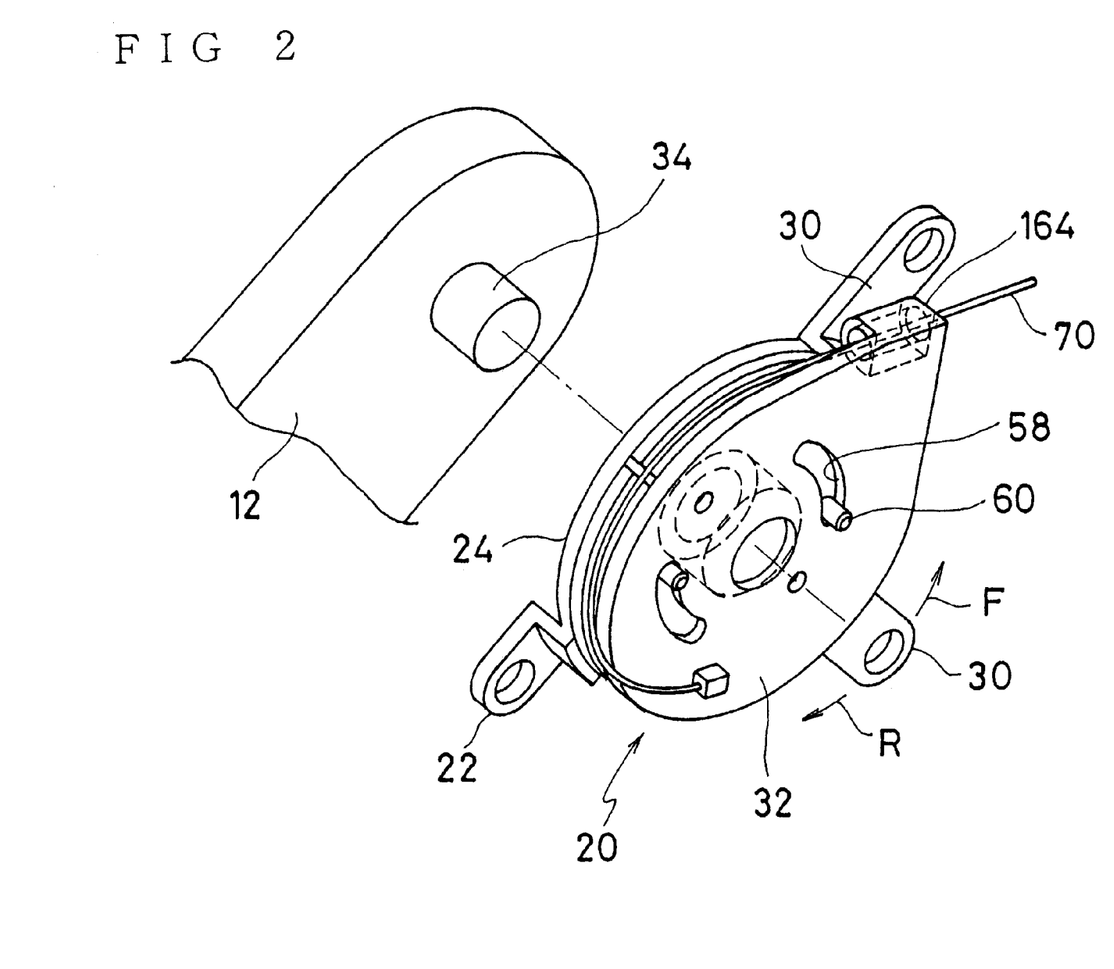
FIG. 2 is a perspective view of a cable winder.
Figure 3:
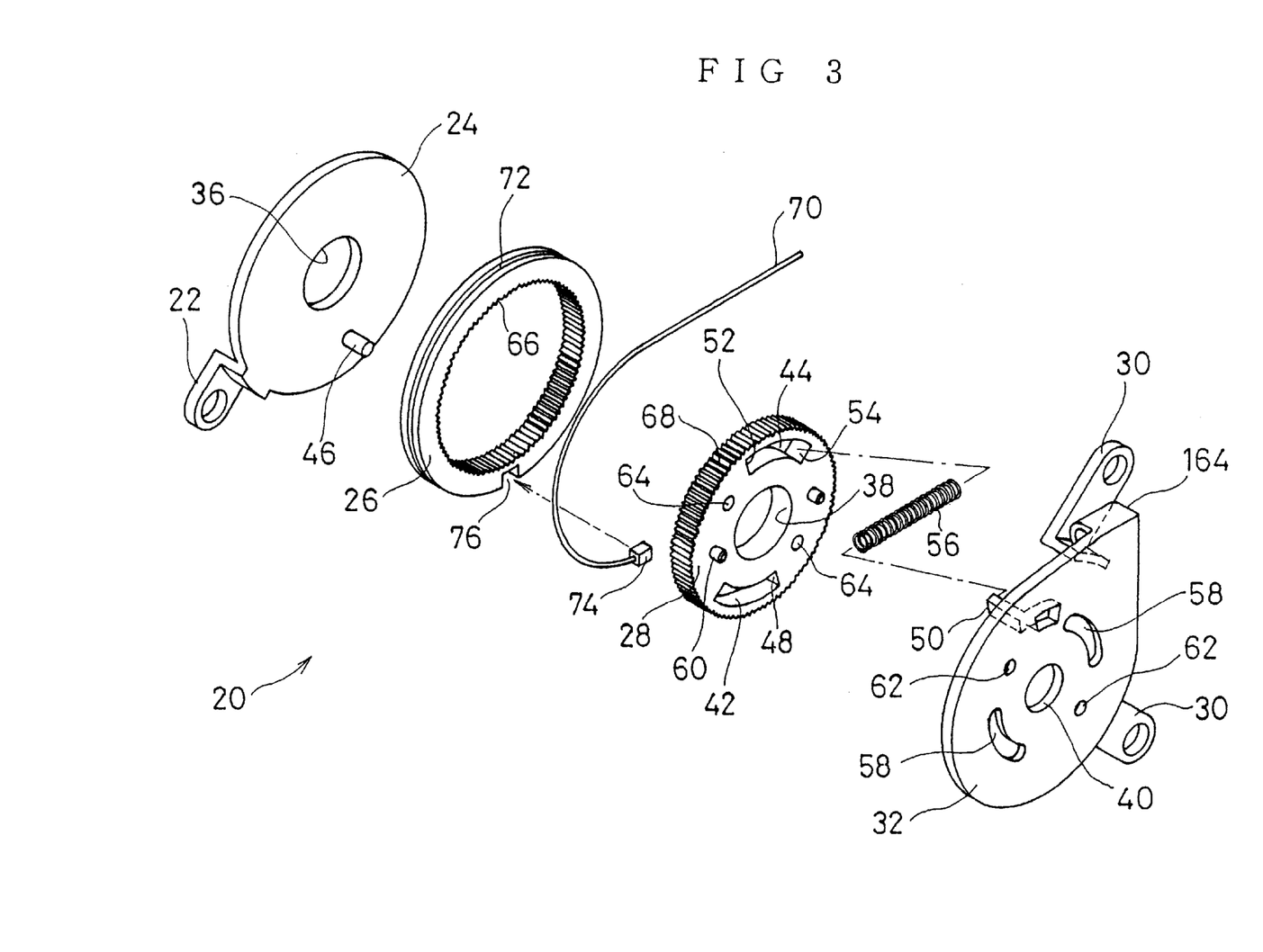
FIG. 3 is an exploded perspective view of the cable winder.

As shown in FIG. 3, the cable winder 20 comprises a fixed plate 24, a fixing leg 22 of which is fixed to the support arm 12, a first fixed ring 26 and a second fixed ring 28 which are supported to the fixed plate 24, and a rotational plate 32, fixing legs 30 of which are fixed to the seat back frame 16 so that the rotational plate 32 rotates according to the pivotal movement of the seat back 14 in the forward incline direction F or the rearward incline direction R as shown in FIG. 2.

The support arm 12 has a fixing shaft 34 projecting from the side thereof. The fixing shaft 34 is inserted into a central hole 36 of the fixed plate 24. The fixing shaft 34 is also inserted into a central hole 38 of the second fixed ring 28 and a central hole 40 of the rotational plate 32.

The second fixed ring 28 is provided with a slit 42 for a stopper pin 46 and a slit 44 for a projection 50 which extend circumferentially. The stopper pin 46 projecting from the fixed plate 24 is inserted into the slit 42.

The second fixed ring 28 is attached to the fixed plate 24 in such a manner that the pin 46 comes into contact with a slit end 48 of the slit 42. As will be described later, when the seat back 14 is in a normal standing attitude or in a rearward inclined attitude, the second fixed ring 28 does not rotate because the second fixed ring 28 is pressed by a spring 56 in such a manner that the pin 46 is normally in contact with the slit end 48.

The rotational plate 32 is provided with the projection 50 projecting toward the second fixed ring 28. The projection 50 is inserted in to the slit 44. The projection 50 is arranged near the initial end 52 of the slit 44 when the seat back 14 is in a normal standing attitude. A coil spring 56 is compressed between the projection 50 and the slit terminal end 54. That is, the spring 56 presses the rotational plate 32 and the ring 28 in such a direction of increasing a space between the projection 50 and the slit terminal end 54 as shown in FIG. 3. Accordingly, the stopper pin 46 is pressed against the slit end 48 of the slit 42 as mentioned above.

The rotational plate 32 is provided with two guide slits 58. Two guide pins 60 projecting from the second fixed ring 28 are inserted into the guide slits 58, respectively. Reference numerals 62, 64 designate alignment holes formed in the rotational plate 32 and the ring 28, respectively. On assembly of the cable winder 20, a tool is inserted into the holes 62 and 64 in order to align the rotational plate 32 with the ring 28.

The first fixed ring 26 is provided with teeth 66 on the inner peripheral surface thereof and the second fixed ring 28 is provided with teeth 68 on the outer peripheral surface thereof so that the first fixed ring 26 can engage with the second fixed ring 28 at any desired angular phase.

The first fixed ring 26 is provided with a groove 72 formed in the outer peripheral surface thereof, onto which the cable 70 is wound. The cable 70 has an end block 74 at an end thereof. The end block 74 is inserted into an end block ditch 76 formed in the outer peripheral surface of the first fixed ring 26.

The reason why two rings 26 and 28 are used to constitute a winding body for the cable 70 as mentioned above is that the cable 70 can lay suitably without slack between the seat belt retractor 80 and the cable winder 20 regardless of the distance between the seat belt retractor 80 and the cable winder 20 depending on the type of a vehicle and a seat.

Figure 4:
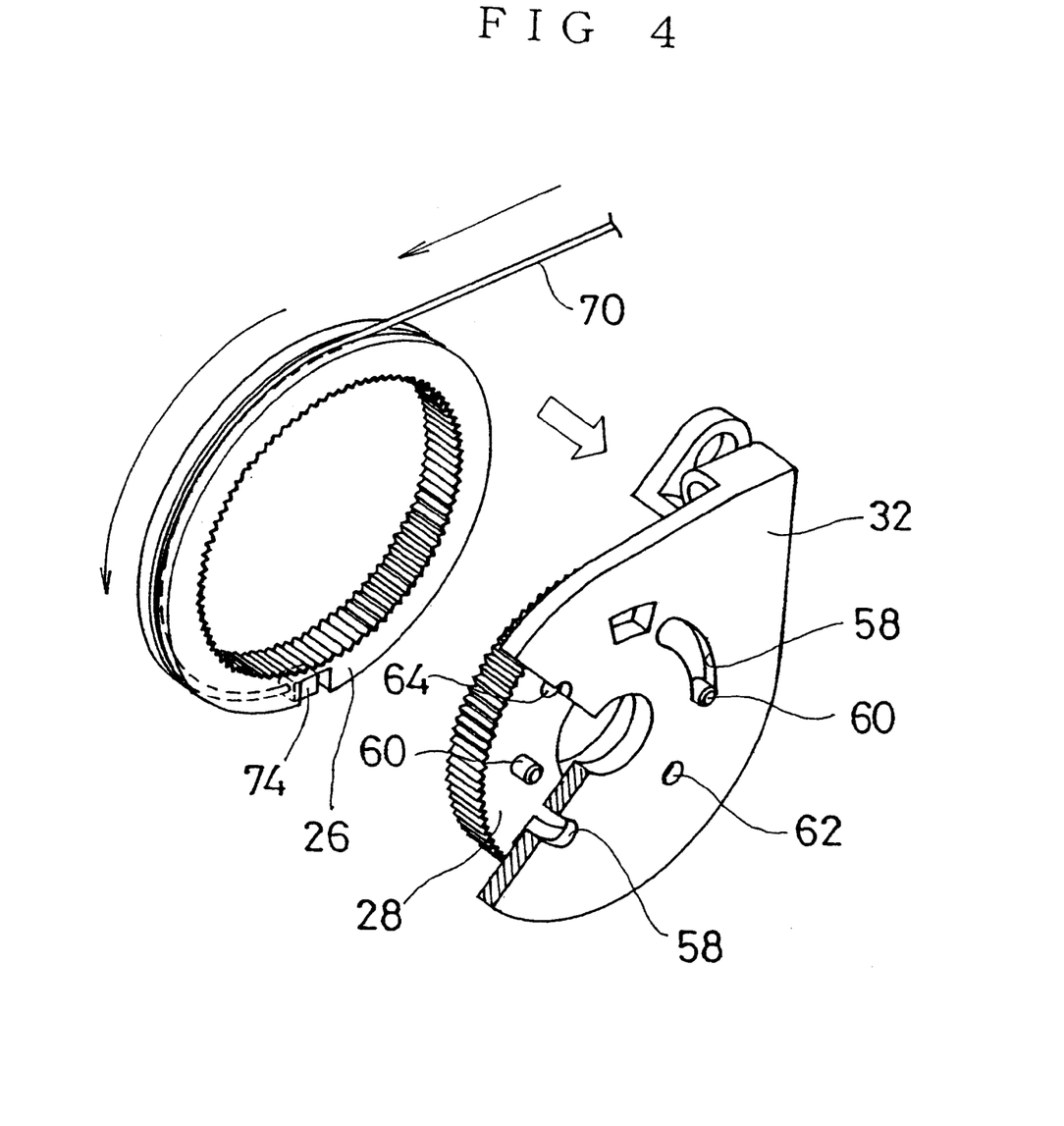
FIG. 4 is an exploded perspective view of the cable winder.
Figure 5:
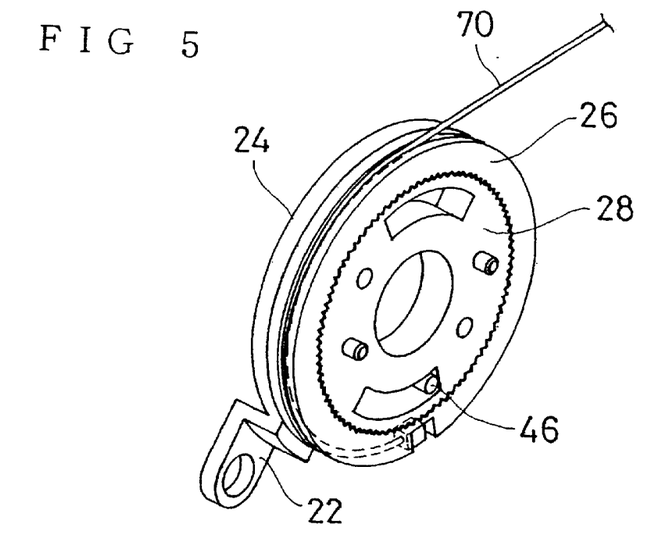
FIG. 5 is a perspective view showing a fixed ring of the cable winder.
Figure 6:
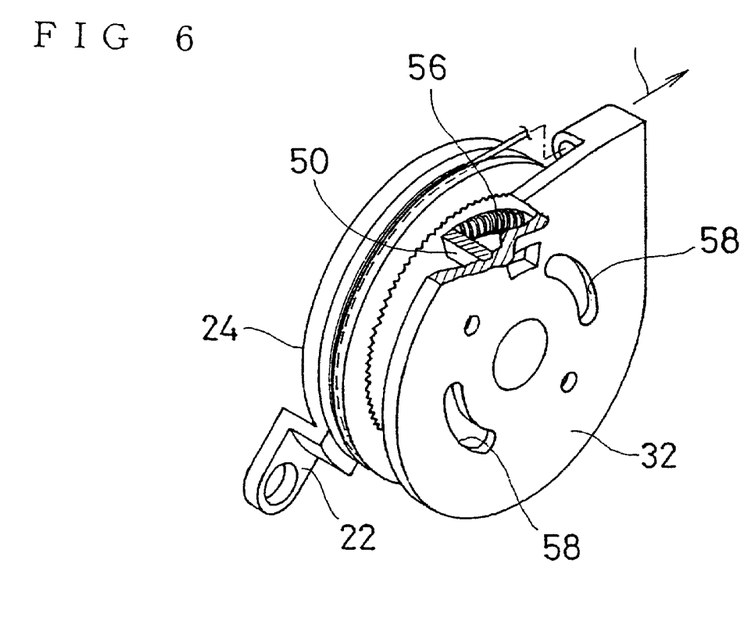
FIG. 6 is a partially cut perspective view of the cable winder.
Figure 7A:
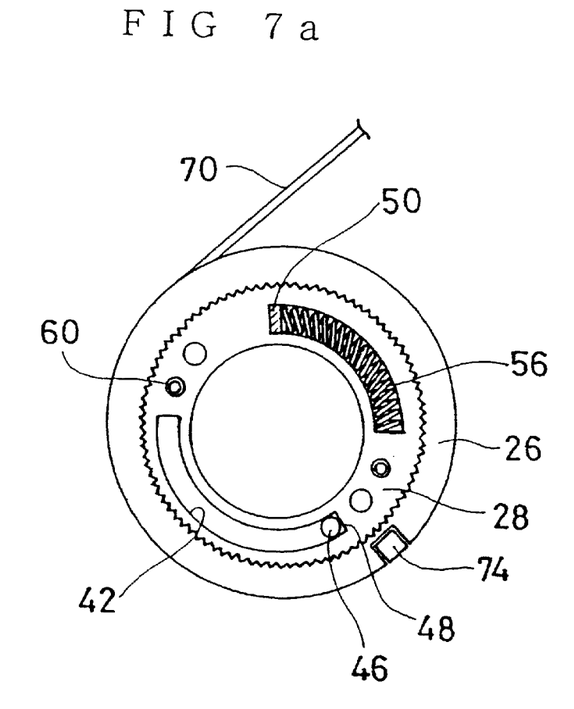
FIG. 7a and FIG. 7b are side views of the fixed ring of the cable winder, FIG. 7a showing a state before a seat is inclined and FIG. 7b showing a state after the seat is inclined.
Figure 7B:
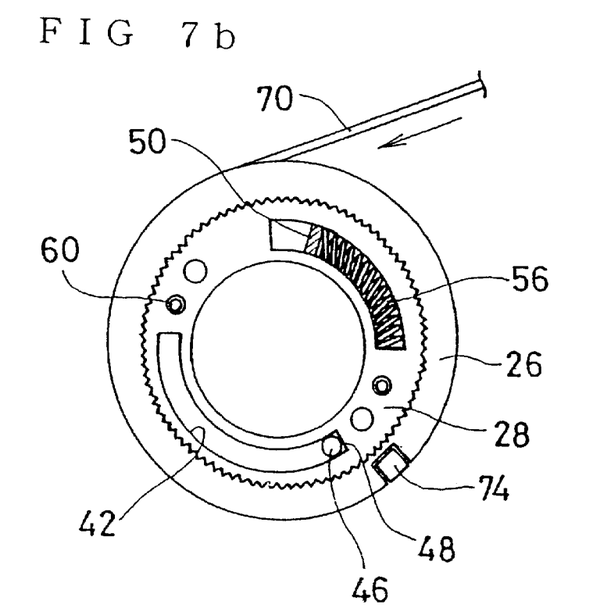

After the seat belt retractor 80 and the fixed plate 24 of the cable winder 20 are incorporated in the seat, the cable 70 is wound on the groove 72 and the end block 74 is inserted into the end block ditch 76. Then, the first fixed ring 26 is rotated in such a manner to eliminate slack of the cable between the seat belt retractor 80 and the cable winder 20 and is engaged to the second fixed ring 28. As shown in FIG. 4, the second fixed ring 28 is previously assembled on the rotational plate 32. After that, the rings 26, 28 and the rotational plate 32 are assembled on the fixed plate 24.

Figure 8:
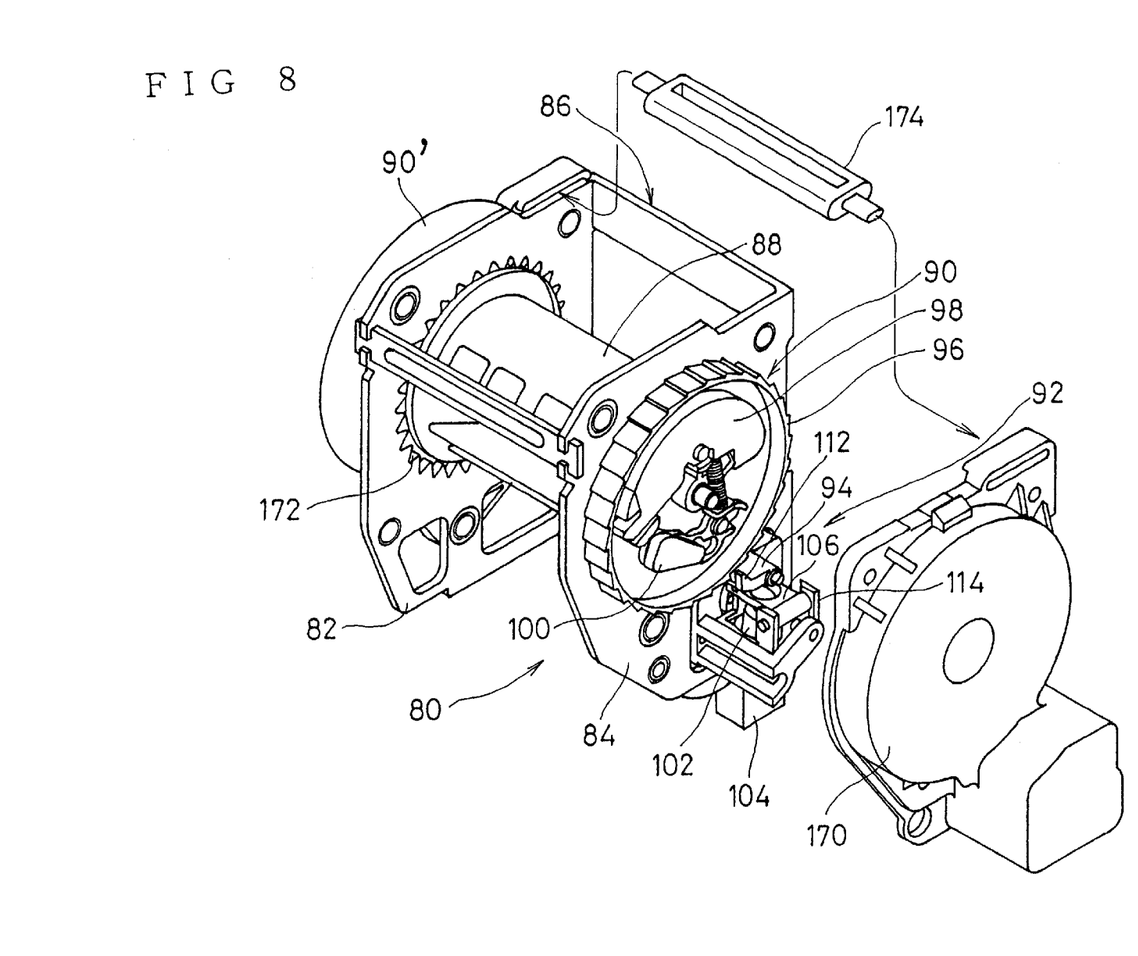
FIG. 8 is an exploded perspective view of a seat belt retractor.
Figure 9:
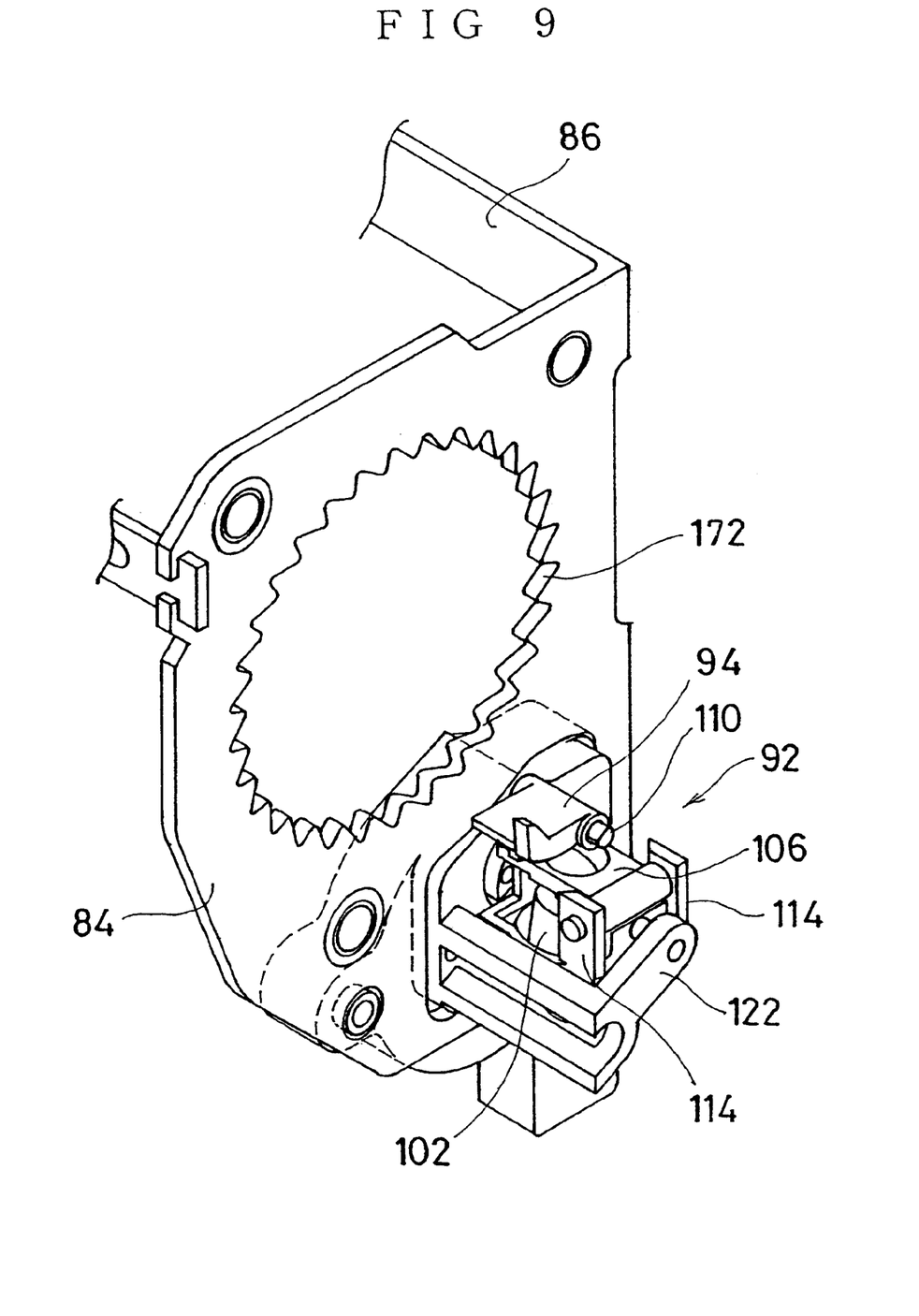
FIG. 9 is a perspective view showing a state of fixing an acceleration sensor of the seat belt retractor.

As shown in FIG. 8, the seat belt retractor 80 has a U-like retractor frame comprising a pair of frame sides 82, 84 and a frame back 86 connecting the frame sides 82, 84. A reel 88 onto which a webbing (not shown) is wound is laid between the frame sides 82 and 84. Mounted on the outer surface of the frame side 82 is a spring casing 90' which accommodates a spring biasing the reel 88 in the webbing winding direction. Mounted on the outer surface of the frame side 84 is a locking mechanism 90 for locking the rotation of the reel 88.

The locking mechanism 90 comprises an acceleration sensor 92, a ratchet wheel 96 engaging with a second arm 94 of the acceleration sensor 92, an inertial member 98 arranged in the ratchet wheel 96, and a link 100 for interlocking the ratchet wheel 96 with pawls (not shown) of the locking mechanism 90.

The acceleration sensor 92 comprises a sensor casing 104 accommodating a sensor weight 102, a first arm 106 pivotably supported in the sensor casing 104, and the second arm 94 which is overlaid on the first arm 106 and is pivotably supported by a shaft 110 of a holder casing 108.

Figure 10:
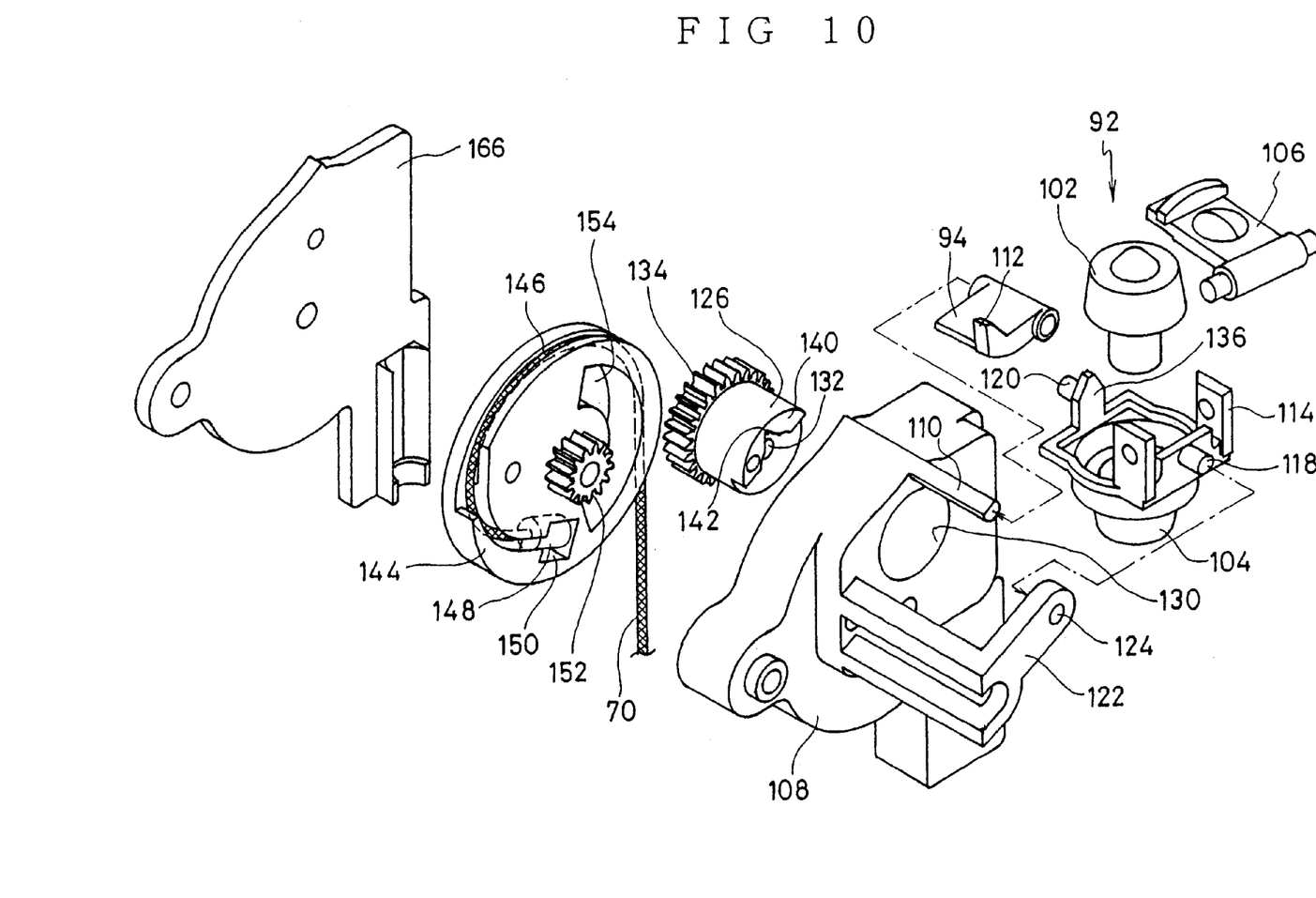
FIG. 10 is an exploded perspective view showing the structure of the acceleration sensor and the structure of a holder casing.

As shown in FIG. 10, the sensor weight 102 is held in the sensor casing 104 in such a manner that the sensor weight 102 can tilt in the horizontal direction. As the sensor weight 102 tilts, the first arm 106 pivots upwards and then the second arm 94 also pivots upwards so that a pawl 112 of the second arm 94 engages with one of teeth formed on the outer periphery of the ratchet wheel 96. The first arm 106 is supported by a pair of holding members 114 standing from the sensor casing 104.

The sensor casing 104 is provided with a pair of shafts 118, 120 arranged coaxially. The shaft 118 is inserted into a hole 124 of a holding arm 122 of the holder casing 108. The holder casing 108 is provided with a rotor hole 130 into which an attitude control rotor 126 for the sensor casing 104 is inserted.

The rotor 126 is rotatably held in the rotor hole 130 and is provided with a hole 132 at the axial portion thereof. The shaft 120 of the sensor casing 104 is inserted into the hole 132.

The attitude control rotor 126 comprises a second pinion gear 134 at one end of the axial direction and an overhang 140 overhanging above a standing piece 136 of the sensor casing 104 at the other end. The overhang 140 is provided with an engaging recess 142 engaging the upper end of the standing piece 136. The shaft 120 projects from the side of the standing piece 136.

The engaging recess 142 is formed substantially in a triangle opening downward and the standing piece 136 has a pointed crown. There is slight play between the recess 142 and the crown of the standing piece 136 (in this embodiment, there is play of about 5° in the rotational direction of the standing piece 136) not just fitting with each other. This play can absorb errors due to the operation of the mechanism or the limitation of precision of parts or assembly. The play may be 3–8°, preferably 4–7°, and more preferably 4–6° around the axis of the hole 132.

A wheel 144 onto which the upper end portion of the cable 70 is wound is rotatably accommodated in the holder case 108. The wheel 144 is provided with a cable groove 146 formed in the outer peripheral surface thereof, onto which the cable 70 is wound. The wheel 144 is also provided with an end block ditch 150 in which an upper end block 148 of the cable 70 is inserted. Furthermore, the wheel 144 is provided with a first pinion gear 152 engaging with the second pinion gear 134 and a spring receiving slit 154 extending circumferentially.

Figure 11:
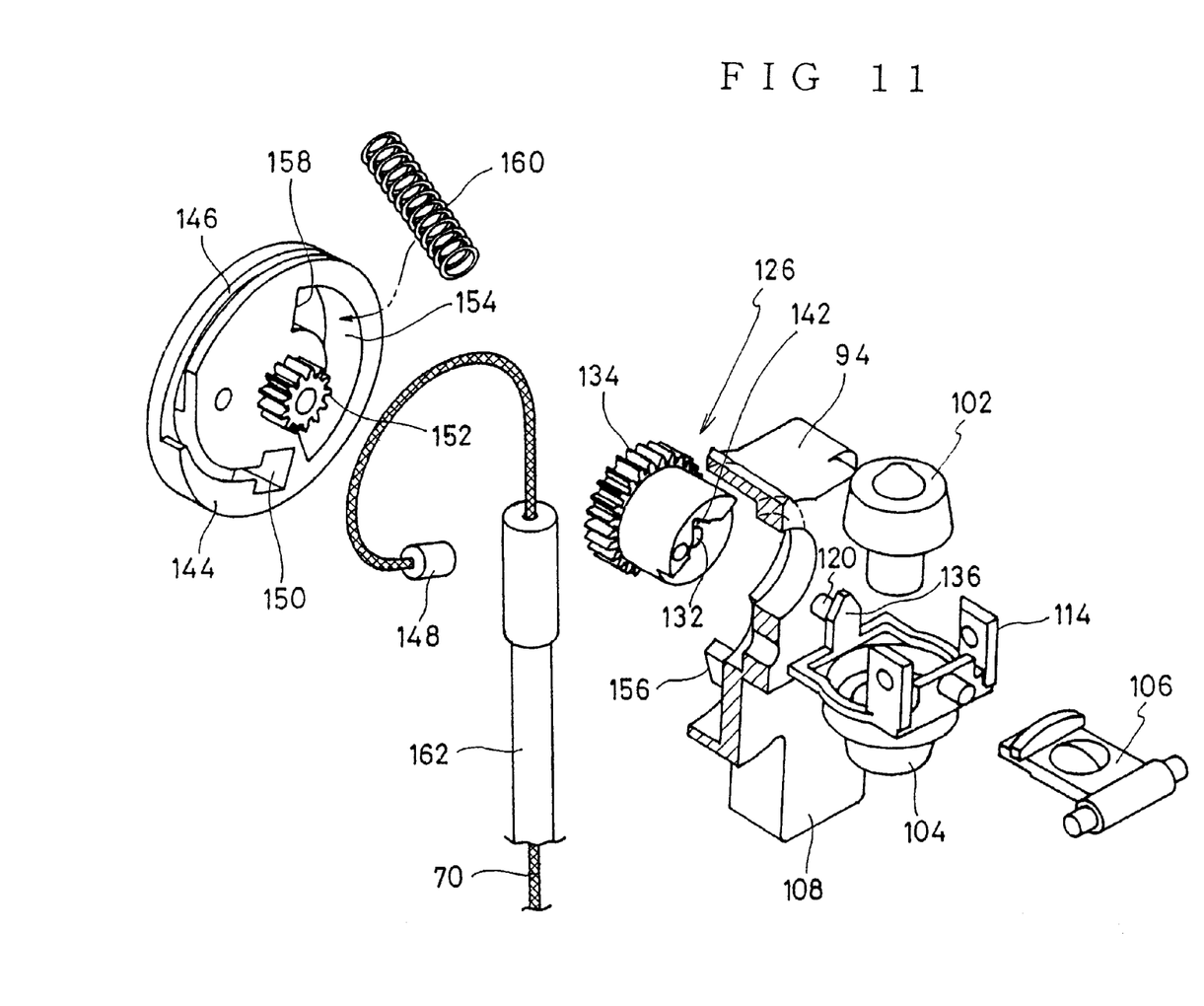
FIG. 11 is an exploded perspective view showing the structure of the acceleration sensor and the structure of the holder casing.
Figure 12:
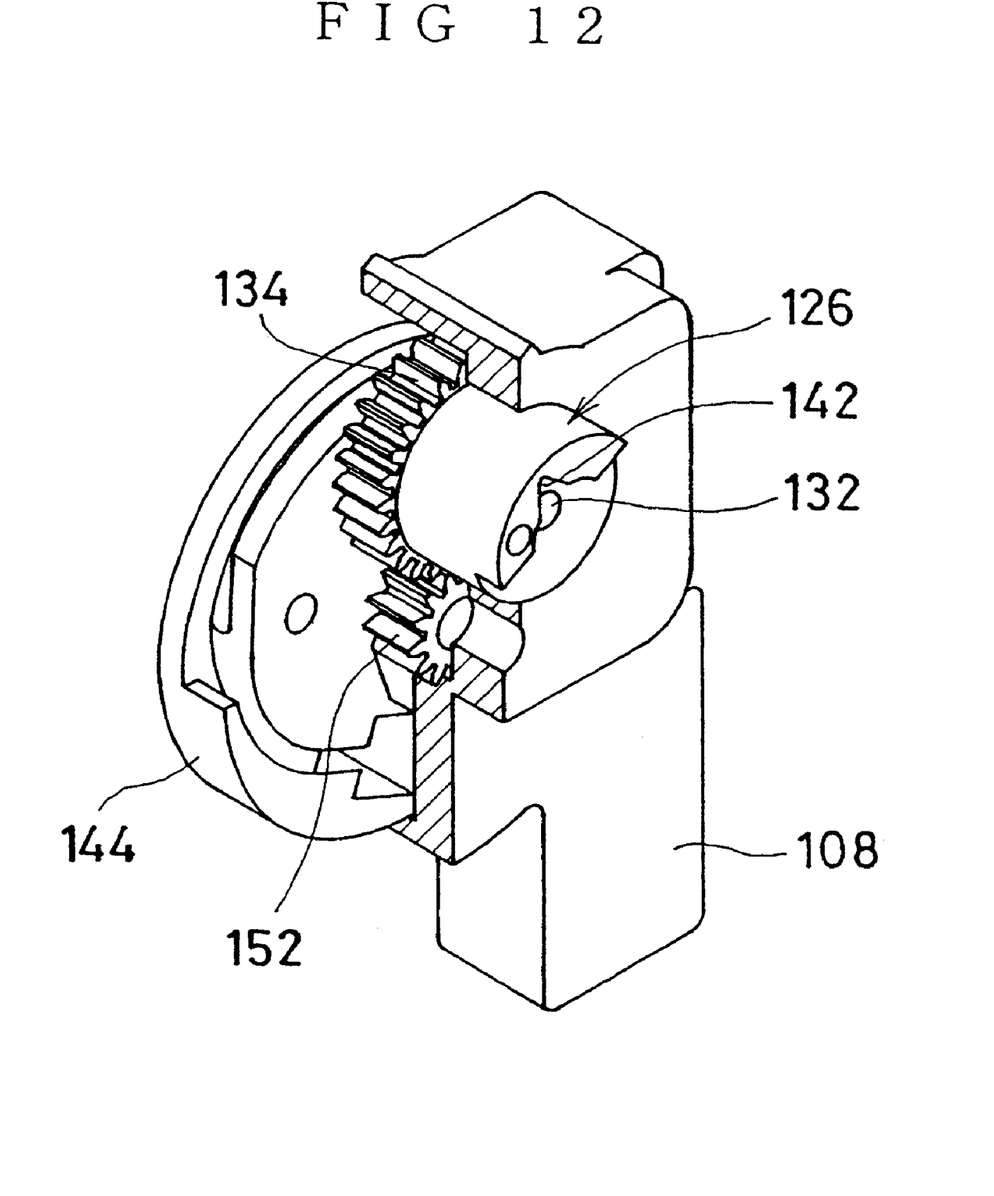
FIG. 12 is a sectional perspective view showing an attitude control mechanism of the acceleration sensor.
Figure 13:
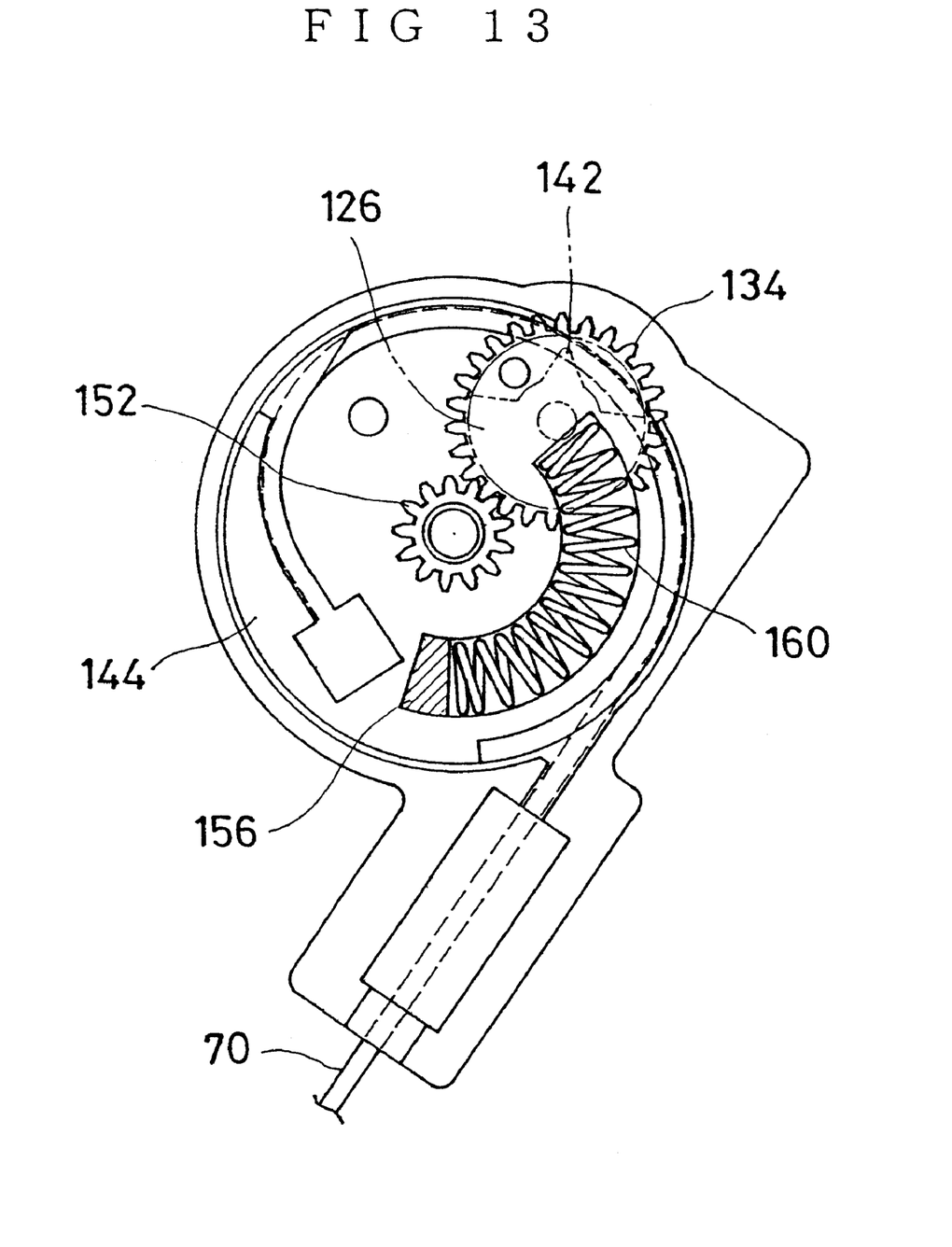
FIG. 13 is a side view of the attitude control mechanism.

As shown in FIG. 11, the holder casing 108 is provided with a projection 156 on the inner surface thereof which is inserted in the spring receiving slit 154. A return spring 160 is compressed between the projection 156 and a slit end 158 of the spring receiving slit 154. The return spring 160 receives the reaction force by the projection 156 to bias the wheel 144 in the counterclockwise direction in FIGS. 10 and 11.

The cable 70 is inserted into a cable tube 162 as shown in FIG. 11. The upper end of the cable tube 162 is fixed to the holder casing 108 and the lower end of the cable tube 162 is fixed to a tube fixing portion 164 of the rotational plate 32 of the cable winder 20.

After the wheel 144 and the attitude control rotor 126 are assembled in the holder casing 108, a holder plate 166 is attached. After that, the holder casing 108 is fixed to the frame side 84 of the seat belt retractor 80 as shown in FIG. 8. Then, the cover 170 is attached to the frame side 84 in such a manner as to cover the locking mechanism 90 and the acceleration sensor 92.

When the acceleration sensor 92 is exerted with an acceleration in the horizontal direction exceeding a predetermined value, the sensor weight 102 tilts so as to raise the first arm 106 and the second arm 94 so that the pawl 112 engages with the ratchet wheel 96. Therefore, the ratchet wheel 96 is stopped from rotating in the webbing unwinding direction. Since the reel 88 intends to further rotate, the ends of the pawls (not shown) move outwardly by the link 100 and engage with respective ones of teeth 172 (FIGS. 8 and 9) formed in the frame sides 82, 94 so that the rotation of the reel 88 is stopped and the webbing is thereby prevented from withdrawing.

The reference numeral 174 in FIG. 8 designates a webbing guide for guiding the webbing withdrawing from the reel 88.

In this seat belt device, as shown in FIGS. 14, 15, and 16, the sensor casing 104 of the acceleration sensor 92 is held by the attitude control rotor 126 in such a manner as to always stand perpendicularly even when the seat back 14 is inclined rearwardly.

FIG. 14a shows the state where the seat back 14 is inclined rearwardly at 25° from the perpendicular direction. When the seat back 14 is further inclined rearwardly at 20° from the state of FIG. 14a as shown in FIG. 15a, the cable 70 is wound onto the periphery of the first fixed ring 26 of the cable winder 20. As the result of this, the cable 70 is pulled by the cable winder 20 and the wheel 144 at the seat belt retractor side, where the upper end of the cable 70 is wound, rotates in the clockwise direction in FIG. 15b. As the wheel 144 rotates, the second pinion gear 134 engaged with the first pinion gear 152 rotates in the counterclockwise direction, the attitude control rotor 126 integrated with the second pinion gear 134 thus rotates, and the standing piece 136 engaging with the engaging recess 142 also rotates in the same direction. Therefore, the sensor casing 104 is directed vertically so that the sensor weight 102 is held in the vertical standing attitude as well as the sensor casing 104.

As the seat back 14 is further inclined rearwardly from the state of FIG. 15a as shown in FIG. 16a, the cable 70 is further wound onto the first fixed ring 26 of the winder 20 so that the wheel 144 further rotates. Thus, the attitude control rotor 126 further rotates and the sensor casing 104 with the standing piece 136 further rotates so that the sensor weight 102 is held in the vertical standing attitude as well as the sensor casing 104.

As mentioned above, even when the seat back 14 is inclined at any angle, the sensor casing 104 rotates in such a manner as to hold the sensor weight 102 in the vertical standing attitude. Therefore, the locking operation of the seat belt retractor 80 is not performed even when the seat back 14 is inclined in any way unless the acceleration exceeding the predetermined value is exerted on the acceleration sensor 92.

When the seat back 14 is returned to the normal position from the states of FIGS. 15a and 16a, the cable 70 is unwound form the cable winder 20 and the wheel 144 rotates in the counterclockwise direction of FIGS. 14a, 15a, and 16a. Then, the second pinion gear 134 rotates in the clockwise direction and the sensor casing 104 with the standing piece 136 rotates in the same direction so that the sensor casing 104 always stands vertically.

As the seat back 14 is inclined rearwardly, the slit end 158 of the wheel 144 moves closer to the projection 156 of the holder casing 108 as shown in FIGS. 15b and 16b so that the return spring 160 is pressurized. In the cable winder 20, the projection 50 of the rotational plate 32 moves closer to the slit end 54 of the second fixed ring 28 so that the spring 56 is pressurized.

Conversely, when the seat back 14 is returned to the standing position shown in FIG. 14a from the position shown in FIG. 15a or FIG. 16a, the wheel 144 is pressed by the return spring 160 so as to securely rotate in the counterclockwise direction of FIGS. 15a and 16a. Then, the cable 70 unwound from the cable winder 20 is securely wound onto the wheel 144. Since the spring 56 is always compressed between the projection 50 of rotational plate 32 and the slit end 54, the second fixed ring 28 is always biased by the spring 56 in the clockwise direction of FIG. 3 so that the stopper pin 46 projecting from the fixed plate 24 is brought in tightly contact with the slit end 48 of the second fixed ring 28 even when the seat back is in any position shown in FIGS. 14a through 16a. Therefore, in cases of FIGS. 14a, 15a and 16a where the seat back 14 is inclined rearwardly, the second fixed ring 28 and the first fixed ring 26 integrated to the second fixed ring 28 do not rotate at all.

There is a case where the seat back 14 is inclined forward to overlaid on the seat cushion 10. In this case, in the cable winder 20, the rotational plate 32 rotates in the counterclockwise direction of FIG. 3 corresponding to the rotation of the seat back 14. Since the projection 50 is in contact with the slit end 52, the second fixed ring 28 rotates in the counterclockwise direction corresponding to the rotation of the rotational plate 32. Since the stopper pin 46 moves within the slit 42 for the stopper pin, the second fixed ring 28 rotates in the counterclockwise direction without interference by the stopper pin 46. Therefore, the seat back 14 can be inclined forward to be overlaid on the seat cushion 12 without any trouble.

As apparent from the above description, according to the present invention, a weight type acceleration sensor can be employed as an acceleration sensor of a seat belt retractor for a seat belt device in which the seat belt retractor is incorporated in a seat back, thereby eliminating requirement of electrical wiring to the seat. This facilitates the assembly of a vehicle and also the maintenance of the vehicle. In the present invention, the attitude of an acceleration sensor can be controlled in such a manner as to hold a sensor weight in the vertical standing attitude regardless of the inclined angle of the seat back.

What I claim:

1. A seat belt device attached to a seat with a seat back and a seat cushion, comprising:

a seat belt retractor including a retractor frame adapted to be attached to the seat back, a reel attached to the retractor frame for winding a seat belt, a locking mechanism attached to the retractor frame for locking a rotation of the seat belt in a withdrawing direction, and an acceleration sensor for activating the locking mechanism, said acceleration sensor being supported on the retractor frame to tilt around a horizontal axis and having a sensor weight which tilts due to an acceleration in a horizontal direction, a rotor engaging the acceleration sensor for controlling a posture of the acceleration sensor, said rotor allowing the acceleration sensor to align vertically, a rotational member adapted to be attached to a support for the seat, said rotational member rotating corresponding to an inclination of the seat back, and a connecting member connecting the rotational member and the rotor so that the acceleration sensor always orients vertically regardless of an inclined angle of the seat back.

2. A seat belt device as claimed in claim 1, wherein said rotational member includes a fixed plate fixed to the support, a rotational plate fixed to the seat back, and a ring situated between the fixed plate and the rotational plate and engaging one end of the connecting member, said ring being rotatable relative to the fixed plate and the rotational plate for a predetermined range.

3. A seat belt device as claimed in claim 2, wherein said fixed plate includes a support pin projecting from the fixed plate; said rotational plate includes a projection; and said ring includes first and second slits, said support pin being located in the first slit for allowing limiting rotation of the ring, and the projection being located in the second slit.

4. A seat belt device as claimed in claim 3, further comprising a spring situated in the second slit for urging the projection of the rotational plate on one side of the second slit.

5. A seat belt device as claimed in claim 2, wherein said ring includes an annular ring having inner teeth on an inner periphery and an outer groove on an outer periphery thereof for receiving the connecting member therein, and an inner ring having outer teeth on an outer periphery thereof, said inner ring being situated inside the annular ring so that the inner and outer teeth engage together.

6. A seat belt device as claimed in claim 5, wherein said inner ring includes a guide pin, and the rotational plate includes a guide slit for receiving the guide pin.

7. A seat belt device as claimed in claim 1, wherein said connecting member is a cable which is wound by said rotational member corresponding to a rearward inclination of the seat back and is thus pulled by said rotational member so as to rotate said rotor.

8. A seat belt device as claimed in claim 7, wherein said cable has a portion at a rotor side which is wound onto a wheel integrated with a first pinion gear to rotate said pinion gear, and a second pinion engaging with said first pinion gear is integrally attached to said rotor.

9. A seat belt device as claimed in claim 1, wherein said sensor comprises a sensor casing pivotably supported to said retractor frame, the sensor weight accommodated in said sensor casing in such a manner that said sensor weight can tilt, and an arm which is raised by said sensor weight to activate said locking mechanism when the sensor weight tilts.

10. A seat belt device as claimed in claim 9, wherein a holder casing is fixed to said retractor frame, said sensor casing is pivotally supported to said holder casing, said sensor casing has a standing piece standing vertically, said rotor is supported to said holder casing so that the rotor can rotate about an axis of the rotor, said rotor has an overhang overhanging above said standing piece of said sensor casing, an upper end of the standing piece engages with an engaging recess formed in a lower surface of said overhang so that the sensor casing is rotated by the rotation of the rotor.

11. A seat belt device as claimed in claim 10, wherein there is a play between the inner surface of said recess of said overhang and the upper end of said standing piece.

* * * * *